United States Patent
Lee et al.

(10) Patent No.: US 11,405,998 B2
(45) Date of Patent: Aug. 2, 2022

(54) ELECTRONIC DEVICE INCLUDING LIGHT EMITTING STRUCTURE

(71) Applicant: Samsung Electronics Co., Ltd., Gyeonggi-do (KR)

(72) Inventors: Juhyup Lee, Gyeonggi-do (KR); Sujin Paik, Gyeonggi-do (KR); Youngkyun Ban, Gyeonggi-do (KR); Youngtae Jeong, Gyeonggi-do (KR); Heeyoung Kim, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 17/015,333

(22) Filed: Sep. 9, 2020

(65) Prior Publication Data

US 2021/0127469 A1  Apr. 29, 2021

(30) Foreign Application Priority Data

Oct. 24, 2019  (KR) ........................ 10-2019-0133204

(51) Int. Cl.
*G04G 21/02* (2010.01)
*H05B 47/105* (2020.01)
*H05B 45/10* (2020.01)
*H05B 45/20* (2020.01)
*F21V 33/00* (2006.01)
(Continued)

(52) U.S. Cl.
CPC ............. *H05B 47/105* (2020.01); *F21K 9/61* (2016.08); *F21V 31/005* (2013.01); *F21V 33/0052* (2013.01); *G04G 21/02* (2013.01); *G06F 1/163* (2013.01); *H05B 45/10* (2020.01); *H05B 45/20* (2020.01); *F21Y 2115/10* (2016.08)

(58) Field of Classification Search
CPC ..... G04G 21/025; G04G 11/00; G04G 9/0041
See application file for complete search history.

(56) References Cited

U.S. PATENT DOCUMENTS 6,206,563 B1  3/2001  Dombre et al.
8,944,659 B2  2/2015  Dabov et al.
(Continued)

FOREIGN PATENT DOCUMENTS

CN  108150922 A  6/2018
CN  208174757 U  11/2018
(Continued)

OTHER PUBLICATIONS

International Search Report dated Dec. 3, 2020.

*Primary Examiner* — William J Carter
(74) *Attorney, Agent, or Firm* — Cha & Reiter, LLC

(57) ABSTRACT

Provided herein is an electronic device. In certain embodiment, the electronic device may comprise: a housing; a cover disposed on at least a portion of the housing; at least one fastening member connected to the housing and configured to be detachably fastened around a human body; at least one light emitting structure disposed in an internal space of the housing; and a waterproof member that is between the housing and the cover, having a closed loop shape sealing the internal space, wherein the waterproof member comprises light scattering material, wherein the light emitting structure is configured to emit light that is at least partially visible from outside through the waterproof member.

16 Claims, 14 Drawing Sheets

(51) Int. Cl.
   *F21V 31/00*   (2006.01)
   *G06F 1/16*    (2006.01)
   *F21K 9/61*    (2016.01)
   *F21Y 115/10*  (2016.01)

(56) References Cited

U.S. PATENT DOCUMENTS

| | | |
|---|---|---|
| 10,655,839 B2* | 5/2020 | Kim .................. F21V 9/32 |
| 2016/0058375 A1 | 3/2016 | Rothkopf |
| 2018/0235491 A1* | 8/2018 | Bayley ............... A61B 5/02427 |
| 2019/0097722 A1* | 3/2019 | McLaurin ............ H04B 10/502 |

FOREIGN PATENT DOCUMENTS

| | | |
|---|---|---|
| JP | 2007-329856 A | 12/2007 |
| KR | 10-0571425 B1 | 4/2006 |
| KR | 10-0777218 B1 | 11/2007 |
| KR | 10-2017-0129635 A | 11/2017 |

* cited by examiner

ELECTRONIC DEVICE INCLUDING LIGHT EMITTING STRUCTURE

CROSS-REFERENCE TO RELATED APPLICATION(S)

This application is based on and claims priority under 35 U.S.C. 119 to Korean Patent Application No. 10-2019-0133204, filed on Oct. 24, 2019, in the Korean Intellectual Property Office, the disclosures of which are herein incorporated by reference in their entireties.

BACKGROUND

Field

Certain embodiments of the disclosure relate to an electronic device including a light emitting structure.

Description of Related Art

Electronic devices are becoming slimmer yet rigid, and include increasing numbers and varieties of functions. Ways of improving aesthetic appearance are sought over conventional information presentation with a display arranged to be partially exposed from the housing.

Electronic devices can perform functions such as obtaining biometric information and data transmission and/or reception. In performing these functions, the electronic device may use the display to notify the user of the corresponding information (e.g., biometric information, or information received and/or transmitted data). However, as the electronic device adopts a large screen display for the design and functionality, frequent activation of the display for simple information notification in addition to the general display function, unnecessarily consumes power. In the case of a wearable electronic device, due to the limited mounting space, the battery may be smaller and have less capacity. Frequent activation of the display for notifications may cause rapid draining of the battery.

SUMMARY

According to certain embodiments, there is provided an electronic device comprising: a housing; a cover disposed on at least a portion of the housing; at least one fastening member connected to the housing and configured to be detachably fastened around a human body; at least one light emitting structure disposed in an internal space of the housing; and a waterproof member that is between the housing and the cover, having a closed loop shape sealing the internal space, wherein the waterproof member comprises light scattering material, wherein the light emitting structure is configured to emit light that is at least partially visible from outside through the waterproof member.

According to certain embodiments, there is provided an electronic device. The electronic device may include: a housing; a cover disposed on at least a portion of the housing; at least one light emitting structure disposed in an internal space of the housing; and a waterproof member that is between the housing and the cover, having a closed loop shape sealing the internal space, wherein the waterproof member comprises light scattering material, wherein the light emitting structure is configured to emit light that is at least partially visible from outside through the waterproof member.

BRIEF DESCRIPTION OF THE DRAWINGS

The above and other aspects, features and advantages of certain embodiments of the disclosure will be more apparent from the following detailed description, taken in conjunction with the accompanying drawings, in which the same or similar reference symbols may be used to refer to the same or like parts, and in which.

DETAILED DESCRIPTION

Accordingly, certain embodiments of the disclosure may provide an electronic device including a light emitting structure. The electronic device saves battery power by emitting light visible from outside the electronic device with the light emitting structure. Accordingly, when the display is inactive (or temporarily turned off) and an event occurs, such as receipt of a text, the electronic device can notify that user by using the light emitting structure, while keeping the display inactive. In this manner, the electronic device avoids consumption of the power required to activate the display.

Certain embodiments of the disclosure may provide an electronic device including a light emitting structure capable of providing visual notification information without driving the display.

Certain embodiments of the disclosure may provide an electronic device including a light emitting structure that is disposed together with a waterproof member for efficient utilization of the mounting space.

The following description with reference to the accompanying drawings is provided to assist in a comprehensive understanding of certain embodiments of the disclosure as defined by the claims and their equivalents. It includes various specific details to assist in that understanding but these are to be regarded as merely exemplary. Accordingly, those of ordinary skill in the art will recognize that various changes and modifications of the certain embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of certain embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
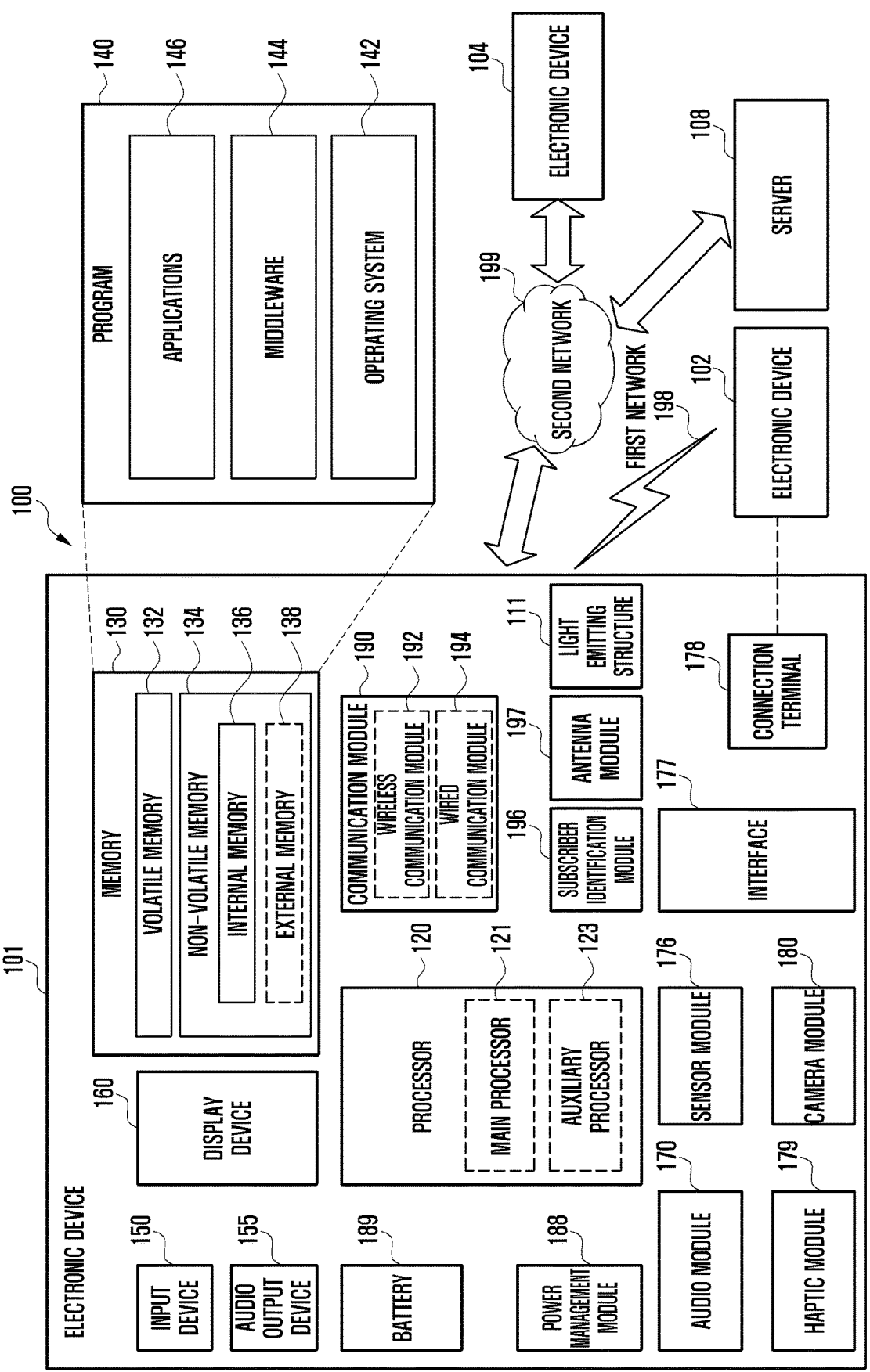
FIG. 1 is a block diagram of an electronic device in a network environment according to certain embodiments of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

It is noted that in certain embodiments, the electronic device 101 can be made smaller in size. For example, in certain embodiments, the electronic device 101 can be made small enough to be wearable on the human body (human wrist, human ankle or human arm). Due size limitations, the battery 189 can have limited capacity. In order to reduce consumption of power from the battery 189, the electronic device may place the display device 160 in an inactive mode after a period of user inactivity.

However, an number of events may occur at the electronic device 101, such as receipt of a text, receipt of an email, or detection of the occurrence of a condition for which the user has requested an alarm. To notify the user, instead of activating the display device 160, the electronic device 101 uses a light emitting structure 111 to emit light that is visible outside the electronic device 101.

Figure 2A:
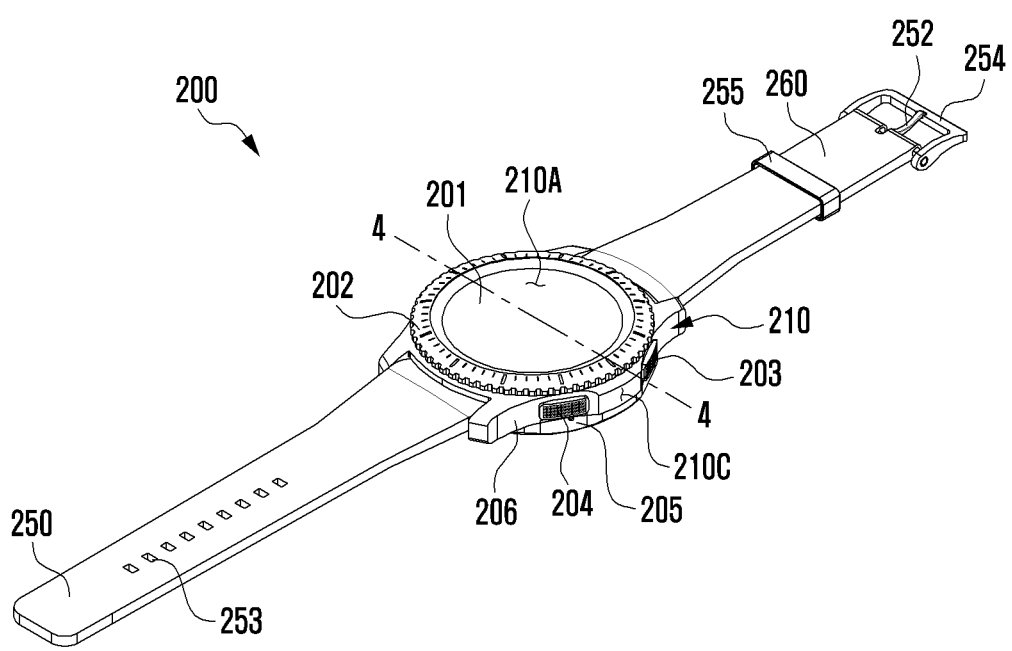
FIG. 2A is a front perspective view of a mobile electronic device according to certain embodiments of the disclosure.
Figure 2B:
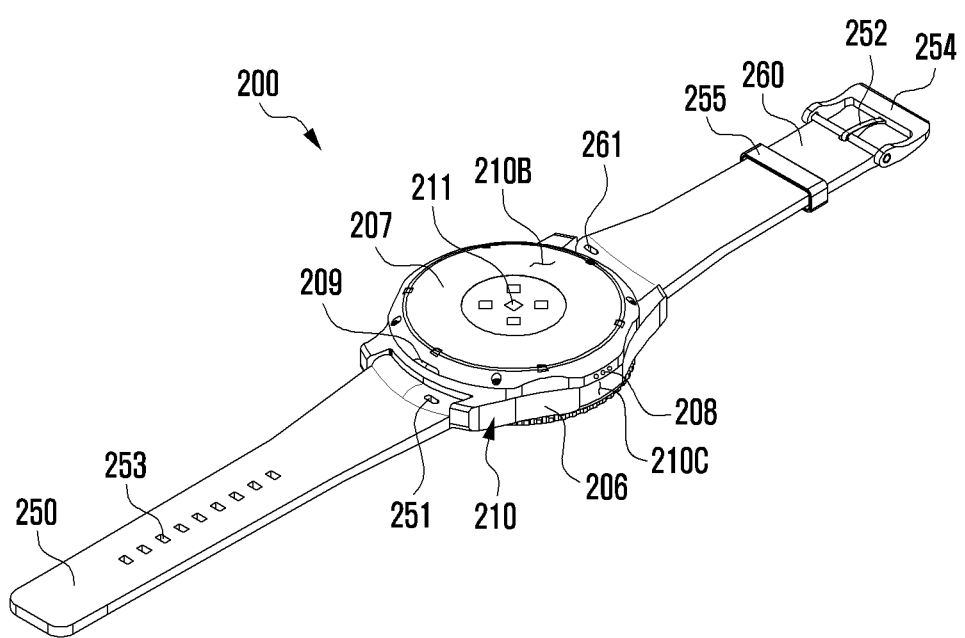
FIG. 2B is a rear perspective view of the electronic device of FIG. 2A according to certain embodiments of the disclosure.

FIG. 2A is a front perspective view of an electronic device 200 according to certain embodiments of the disclosure. FIG. 2B is a rear perspective view of the electronic device 200 of FIG. 2A according to certain embodiments of the disclosure.

The electronic device 200 of FIGS. 2A and 2B may further include at least some similar or different embodiments of the electronic device 101 of FIG. 1.

With reference to FIGS. 2A and 2B, in one embodiment, the electronic device 200 may include: a housing 210 including a first surface (or, front surface) 210A, a second surface (or, rear surface) 210B, and a side surface 210C surrounding the space between the first surface 210A and the second surface 210B. The electronic device may include fastening members 250 and 260 (e.g., strap, connection member, or coupling member) connected to at least a portion of the housing 210 and configured to detachably fasten the electronic device 200 to a body part (e.g., wrist, ankle, etc.) of the user. In another embodiment (not shown), the housing 210 may refer to a structure forming some of the first surface 210A, the second surface 210B, and the side surface 210C in FIG. 2A.

In one embodiment, the first surface 210A may be formed by a front plate 201 that is substantially transparent at least in part (e.g., glass plate containing various coating layers, or polymer plate). The second surface 210B may be formed by a rear plate 207 that is substantially opaque. The rear plate 207 may be made of, for example, coated or colored glass, ceramic, polymer, metal (e.g., aluminum, stainless steel (STS), or magnesium), or a combination thereof. The side surface 210C is coupled to the front plate 201 and the rear plate 207 and may be formed by a side bezel structure (or, side member) 206 containing metal and/or polymer. In a certain embodiment, the rear plate 207 and the side bezel structure 206 may be integrally formed and contain the same material (e.g., metal material such as aluminum). The fastening members 250 and 260 may be made of various materials and formed in various shapes. The fastening members 250 and 260 may be formed as a single body or as plural unit links that are movable with each other, by woven material, leather, rubber, urethane, metal, ceramic, or a combination thereof.

In one embodiment, the electronic device 200 may include at least one of a display (e.g., display 220 in FIG. 3), an audio module (205 and 208), a sensor module 211, key input devices 202, 203 and 204, or a connector hole 209. In a certain embodiment, at least one of the components (e.g., key input device 202, 203 or 204, connector hole 209, and sensor module 211) may be removed from the electronic device 200, or a different component may be added to the electronic device 200.

The display (e.g., display 220 in FIG. 3) can be viewed through, for example, a significant portion of the front plate 201. The display (e.g., display 220 in FIG. 3) may have a shape corresponding to the shape of the front plate 201 and may have one of various shapes such as a circle, an ellipse, and a polygon. The display 220 may be disposed in combination with or adjacent to a touch sensing circuit, a pressure sensor capable of measuring the intensity (pressure) of a touch, and/or a fingerprint sensor.

The audio module (205 and 208) may include a microphone hole 205 and a speaker hole 208. In the microphone hole 205, a microphone for picking up external sounds may be disposed therein, and plural microphones may be arranged to sense the direction of sound in a certain embodiment. The speaker hole 208 can be used for an external speaker and a call receiver. In a certain embodiment, the speaker hole 208 and the microphone hole 205 may be implemented as a single hole, or a speaker (e.g., piezo speaker) may be included without the speaker hole 208.

The sensor module 211 may generate an electrical signal or data value corresponding to an internal operating state of the electronic device 200 or an external environmental state. The sensor module 211 may include, for example, a biometric sensor module 211 (e.g., HRM sensor) disposed on the second surface 210B of the housing 210. The electronic device 200 may further include a sensor module (not shown) including at least one of, for example, a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The key input devices 202, 203 and 204 may include a wheel key 202 disposed on the first surface 210A of the housing 210 and rotatable in at least one direction, and/or side key buttons 203 and 204 disposed on the side surface 210C of the housing 210. The wheel key may have a shape corresponding to the shape of the front plate 201. In another embodiment, the electronic device 200 may not include some or all of the key input devices 202, 203 and 204 described above, and the key input device 202, 203 or 204 that is not included may be implemented in other forms, such as soft keys, on the display 220. The connector hole 209 may accommodate a connector (e.g., USB connector) for transmitting and receiving power and/or data to and from an external electronic device, and may include another connector hole (not shown) that can accommodate a connector for transmitting and receiving an audio signal to and from an external electronic device. The electronic device 200 may further include, for example, a connector cover (not shown) that covers at least a portion of the connector hole 209 and blocks foreign substances from entering the connector hole.

The fastening members 250 and 260 may be detachably fastened to at least a portion of the housing 210 by using locking members 251 and 261. The fastening members 250 and 260 may include one or more of a fixing member 252, fixing member fastening holes 253, a band guide member 254, and a band fixing ring 255. The fixing member 252 may be configured to fix the housing 210 and the fastening members 250 and 260 to a body part (e.g., wrist, or ankle) of the user. The fixing member fastening holes 253 may fix the housing 210 and the fastening members 250 and 260 to a body part of the user in correspondence to the fixing member 252. The band guide member 254 may be configured to limit the range of movement of the fixing member 252 when the fixing member 252 engages with a fixing member fastening hole 253, so that the fastening members 250 and 260 may be fastened in close contact to a body part of the user. The band fixing ring 255 may limit the range of movement of the fastening members 250 and 260 while the fixing member 252 and the fixing member fastening hole 253 are fastened.

Since the electronic device 200 can be fastened to the human body, such as worn on the wrist, in certain embodiments, the housing 210 may have a diameter no larger than the width of a typical human wrist or approximately 2 inches/5 cm. As a result, the battery may have a limited capacity. To conserve power, the display may be deactivated during periods of user inactivity. However, when an event occurs ath the electronic device 200, the electronic device 200 notifies the user by emitting light that is visible from outside the electronic device 200. In certain embodiments, the electronic device 200 may emit light to notify the user of the event, while maintaining the display in the inactive state.

Figure 3:
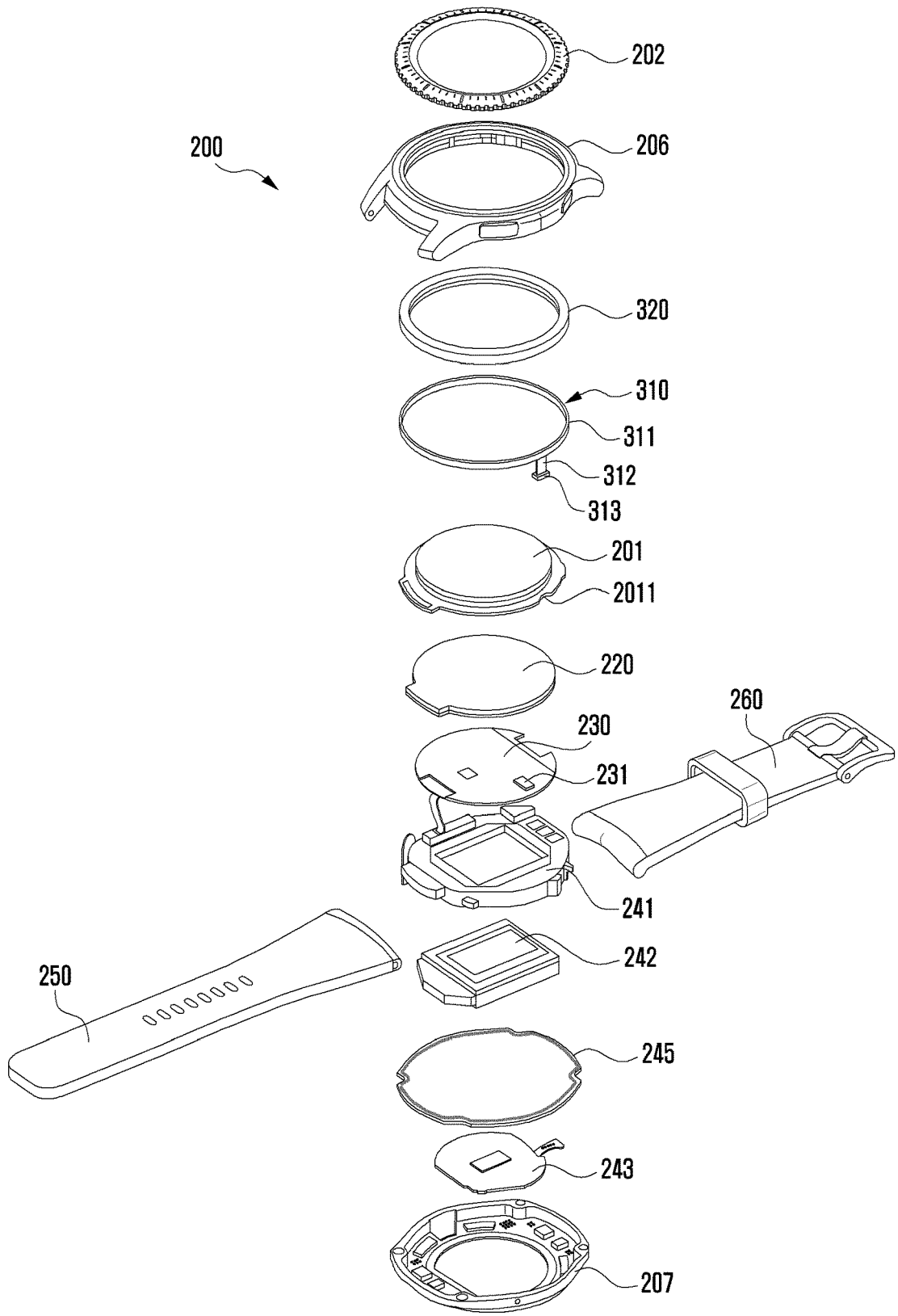
FIG. 3 is an exploded perspective view of an electronic device according to certain embodiments of the disclosure.

FIG. 3 is an exploded perspective view of an electronic device according to certain embodiments of the disclosure.

With reference to FIG. 3, the electronic device 200 may include a side bezel structure 206 (e.g., side member), a wheel key 202, a front plate 201, a display 220, a printed circuit board 230, a support member 241 (e.g., bracket), a battery 242, a sealing member 245, an antenna 243, a rear plate 207, and fastening members 250 and 260 (or, mounting members). At least one of the components of the electronic device 200 may be identical or similar to at least one of the components of the electronic device 200 of FIGS. 2A and 2B, and repeated descriptions are omitted herein.

As will be described below, the electronic device 200 includes a light emitting structure 310. The light emitting structure 310 may be configured to emit light through a waterproof member 320 that is visible from outside the electronic device 200. The light emitting structure 310 can provide visual notification information to the user without requiring activation of a display 220. In certain embodiments, the light emitting structure 310 consumes considerably less power than activation of the display 220. Accordingly, using the light emitting structure 310 for notifications to the user results in reduced power consumption.

The support member 241 disposed inside the electronic device 200 may be formed to be connected to the side bezel structure 206 or be integrally formed with the side bezel structure 206. The support member 241 may be made of, for example, a metal material and/or a non-metal (e.g., polymer) material. The support member 241 may have one surface coupled to the display 220 and the printed circuit board 230, and the other surface coupled to the battery 242. A processor, a memory, and/or an interface may be mounted on the printed circuit board 230. The processor may include one or more of, for example, a central processing unit, an application processor, a graphics processing unit (GPU), an application processor, sensor processor, and a communication processor.

The memory may include, for example, a volatile memory or a nonvolatile memory. The interface may include, for example, a high definition multimedia interface (HDMI), a universal serial bus (USB) interface, an SD card interface, and/or an audio interface. The interface allows the electronic device 200 to electrically or physically connect to an external electronic device, and may include, for example, a USB connector, an SD card/MMC connector, or an audio connector.

The battery 242 is a device for supplying power to at least one component of the electronic device 200, and may include, for example, a non-rechargeable primary cell, a rechargeable secondary cell, or a fuel cell. At least a portion of the battery 242 may be disposed substantially on the same plane as, for example, the printed circuit board 230. The battery 242 may be disposed as a single body within the electronic device 200 or may be detachably disposed from the electronic device 200. The battery 242 can have a limited power supply before needing to be recharged. As a result, it can be important to reduce power consumption of the electronic device 200.

The antenna 243 may be disposed between the support member 241 and the rear plate 207. The antenna 243 may include, for example, a near field communication (NFC) antenna, a wireless charging antenna, and/or a magnetic secure transmission (MST) antenna. For example, the antenna 243 may perform short-range communication with an external device, wirelessly transmit or receive power required for charging, and transmit a short-range communication signal or a magnetic-based signal including payment data. In another embodiment, an additional antenna for legacy band communication may be disposed by using portions of the side bezel structure 206 and/or the support member 241 or a combination thereof.

The sealing member 245 may be positioned between the side bezel structure 206 and the rear plate 207. The sealing member 245 may be configured to block moisture and foreign matter flowing into the space surrounded by the side bezel structure 206 and the rear plate 207 from the outside.

In certain embodiments, the electronic device 200 may include a waterproof member 320 disposed between the front plate 201 (e.g., window) and the side bezel structure 206 (e.g., side member), and a light emitting structure 310 disposed between the waterproof member 320 and the front plate 201. In one embodiment, the waterproof member 320 is disposed between the front plate 201 and the inner bezel of the side bezel structure 206 (e.g., inner bezel 2101 in FIG. 4) to thereby prevent an inflow of foreign substances and/or moisture. Hence, the waterproof member 320 may be formed in a closed loop shape so as to surround the rim of the front plate 201 and the inner rim of the side bezel structure 206.

In certain embodiments, the light emitting structure 310 may include a light guide member 311, an extension part 312 extending from the light guide member 311 toward the printed circuit board 230, and a connector 313 including a light emitter (e.g., light emitter 3131 in FIG. 5) electrically connected to the printed circuit board 230 through at least a portion of the front plate 201. In one embodiment, the light guide member 311 may include an optical fiber (bundle) wound multiple times. In one embodiment, the light emitter 3131 may include at least one LED. In another embodiment, the light guide member 311 may include a surface light-emitting body that emits light when power is applied. In one embodiment, the light guide member 311 may be configured to have a size and shape substantially corresponding to (facing) the waterproof member 320. In one embodiment, the extension part 312 may be extended to be electrically connected from the light guide member 311 and may be formed to have a length that can connect to the printed circuit board 230 through the through groove 2011 formed at a portion of the rim of the front plate 201 below. In one embodiment, the connector 313 may be connected to a connector socket 231 disposed on the printed circuit board 230 so as to guide light from the light emitter 3131 to the light guide member 311 through the extension part 312.

In certain embodiments, when it is necessary to provide visual notification information to the user, the electronic device 200 (e.g., processor) may provide various visual indications visible from the outside through the light emitting structure 310 without activating the display 220. For example, the visual notification information may include biometric information detected through a sensor (e.g., sensor 211 in FIG. 2B), information about data received from an external device, or various status information of the electronic device such as information about the remaining battery level and information about the internal temperature.

Next, a detailed description is given of the arrangement structure of the light emitting structure 310.

Figure 4:
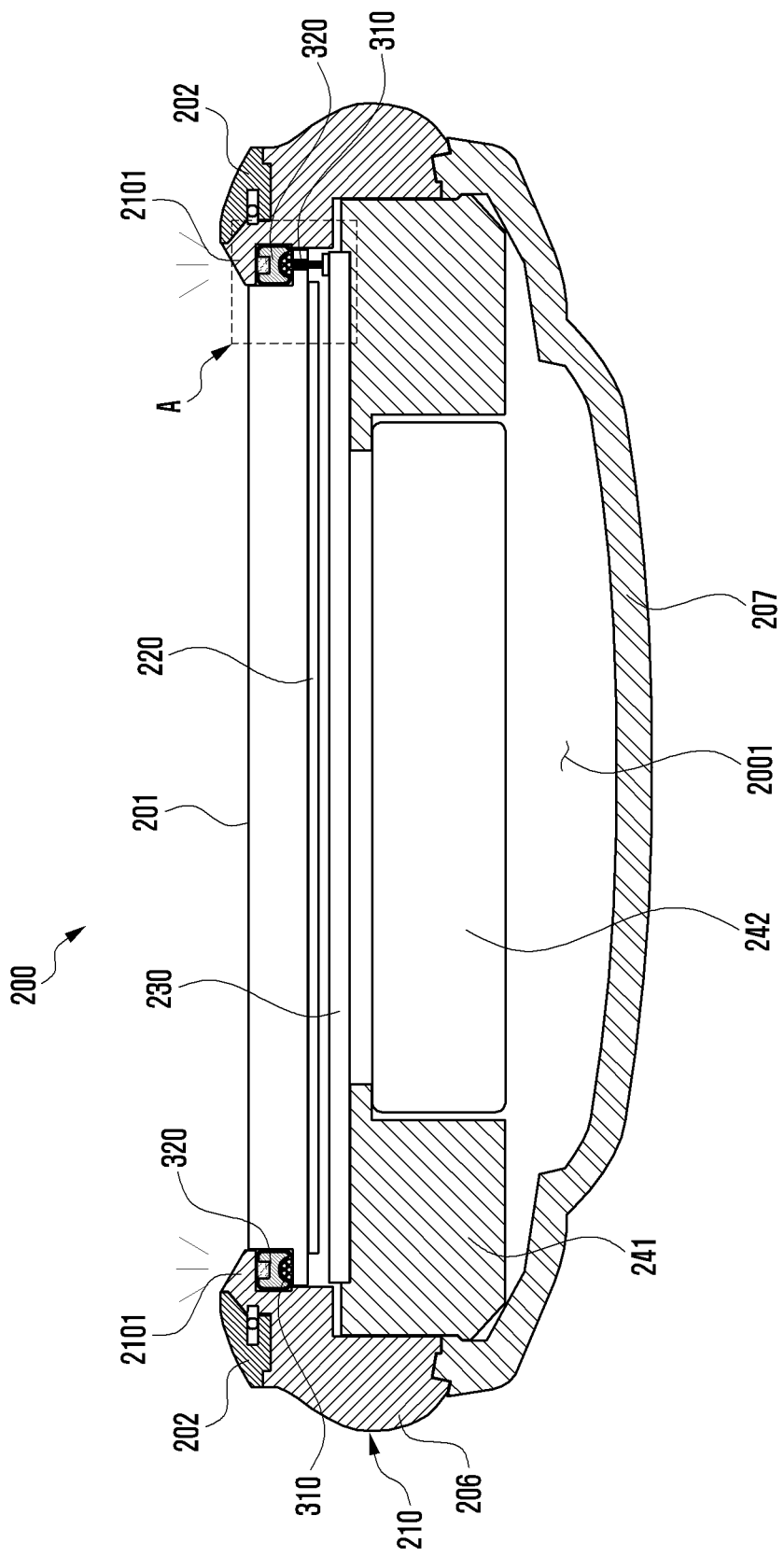
FIG. 4 is a partial cross-sectional view of the electronic device along the line 4-4 in FIG. 2A according to certain embodiments of the disclosure.
Figure 5:
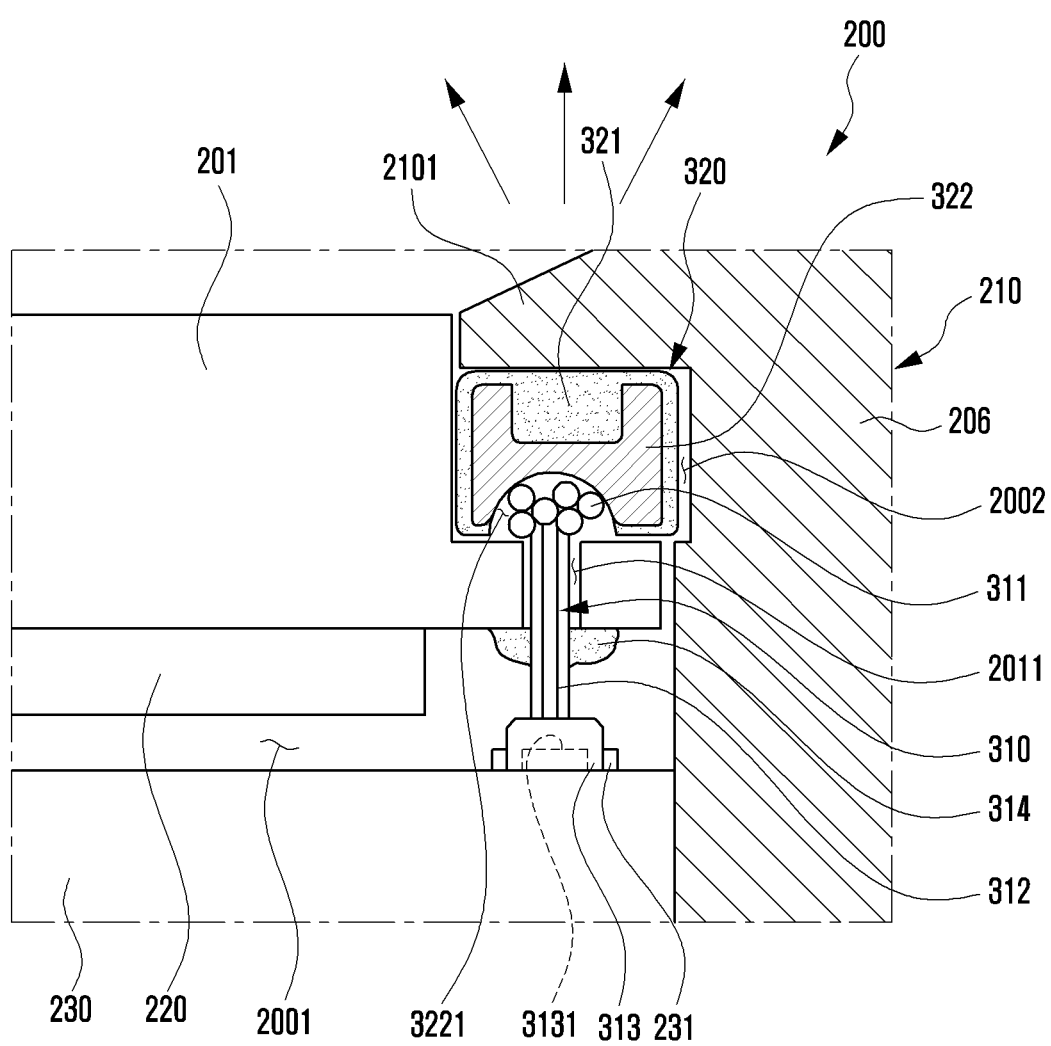
FIG. 5 is an enlarged view of region A in FIG. 4 according to certain embodiments of the disclosure.

FIG. 4 is a partial cross-sectional view of the electronic device 200 along the line 4-4 in FIG. 2A according to certain embodiments of the disclosure. FIG. 5 is an enlarged view of region A in FIG. 4 according to certain embodiments of the disclosure.

With reference to FIGS. 4 and 5, the electronic device 200 may include a front plate 201 (e.g., front cover, or window), a rear plate 207 (e.g., rear cover) facing away from the front plate 201, and a housing 210 including a side bezel structure 206 (e.g., side member) surrounding the internal space 2001 between the front plate 201 and the rear plate 207. In one embodiment, the front plate 201 may be arranged to be engaged with the side bezel structure 206 in an outer direction in the internal space 2001. In one embodiment, the electronic device 200 may include a support member 241 disposed to be supported by at least a portion of the side bezel structure 206 in the internal space 2001. In one embodiment, the electronic device 200 may include a printed circuit board 230 disposed to be supported by the support member 241 between the support member 241 and the front plate 201. In one embodiment, the electronic device 200 may include a display 220 disposed on the rear surface of the front plate 201 between the printed circuit board 230 and the front plate 201. In one embodiment, the electronic device 200 may include a battery 242 disposed to be supported by the support member 241 between the support member 241 and the rear plate 207. In one embodiment, the battery 242 may supply power to the printed circuit board 230, and the supplied power may be used to turn on at least one light emitter 3131 of the light emitting structure 310.

In certain embodiments, the electronic device 200 may include a waterproof member 320 that is disposed in the space 2002 between the front plate 201 and the side bezel structure 206 to provide a sealing force. In one embodiment, the waterproof member 320 may include a rigid body 322 (e.g., polycarbonate (PC) or metal) and an elastic body 321 injected together with the rigid body 322. In one embodiment, the elastic body 321 may be made of an elastic material such as rubber, urethane, or silicone. In one embodiment, the rigid body 322 and the elastic body 321 of the waterproof member 320 may be made of a light scattering material for transmitting light emitted from the light guide member 311 disposed below to the outside of the electronic device 200. In one embodiment, the inner bezel 2101 of the side bezel structure 206 facing the waterproof member 320 may also be made of a light scattering material. In one embodiment, the inner bezel 2101 may be integrally formed with the side bezel structure 206 or be separately prepared for structural coupling. In another embodiment, the inner bezel 2101 may be replaced with a decorative member that is made of a light scattering material and coupled with the side bezel structure 206. In one embodiment, the waterproof member 320 may include a seating groove 3221 formed to at least partially seat the light guide member 311. In one embodiment, the seating groove 3221 may be formed through the rigid body 322. In another embodiment, the seating groove 3221 may be formed at least partially through the elastic body 321. In one embodiment, the waterproof member 320 may be disposed to surround the outer surface of the rigid body 322 to provide an effective sealing force. In this case, at least a portion of the seating groove 3221 may be arranged to expose the rigid body 322.

In certain embodiments, the light emitting structure 310 may include a light guide member 311, an extension part 312 extending from the light guide member 311 toward the printed circuit board 230, and a connector 313 electrically connected to the printed circuit board 230 via a through groove 2011 formed in the rim of the front plate 201. In one embodiment, the connector 313 may be electrically connected to a connector socket 231 of the printed circuit board 230. In one embodiment, the light emitting structure 310 may include at least one light emitter 3131 that is disposed on the connector 313 and provides light to the light guide member 311 through the extension part 312 during light emission. In one embodiment, the light emitter 3131 may include at least one of LEDs with various colors such as R (red), G (green), B (blue), or W (white).

In certain embodiments, different colors can be associated with particular situations. For example, the light emitter 3131 can emit a red light as a warning regarding certain malfunctioning events, such as low battery, internal overheating, unsuccessful attempt to read biometric data, failure to authenticate the biometric data, or an error message, to name a few. The light emitter 3131 can emit green light to indicate normal operation, such as sufficient battery, successful capturing of biometric data, and valid authentication using biometric data. The colors can also be associated with different events. For example, blue can indicate an incoming text.

In an embodiment, the white color can indicate a request for biometric data, blue can indicate that the biometric data is in the process of being captured, green can indicate that the biometric data was successfully captured and successful authentication, while red can indicate that the biometric data was not successfully captured or a failure to authenticate.

In one embodiment, the light guide member 311 may be disposed such that all or at least a portion thereof is seated in the seating groove 3221 of the waterproof member 320. In one embodiment, the extension part 312 penetrating the through groove 2011 of the front plate 201 may be fixed in position by an adhesive member 314 together with at least a portion of the front plate 201. In another embodiment, the extension part 312 may be extended to the printed circuit board 230 through a groove (e.g., seating groove) formed at at least a portion of the rim (e.g., edge) of the front plate 201. In another embodiment, the extension part 312 may be extended through a hole formed in the front plate 201 to the printed circuit board 230.

In certain embodiments, when the light emitter 3131 is turned on to provide visual notification information to the user without driving the display 220, light emitted by the light emitter 3131 may be transmitted to the light guide member 311 through the extension part 312. In one embodiment, the light transmitted to the light guide member 311 may be released to the outside of the electronic device 200 through the waterproof member 320 and/or the inner bezel 2101 made of a light scattering material. In another embodiment, the light transmitted to the light guide member 311 may be released to the outside through a wheel key (e.g., wheel key 202 in FIG. 4) that is rotatably disposed on the side bezel structure 206 and made of a light scattering material.

In certain embodiments, the light emitting structure is only capable of displaying a single color at one time over the entirety of the light emitting structure and has a power consumption of less than 5% of the power consumed by the display 220 when the display is active.

Figure 6A:
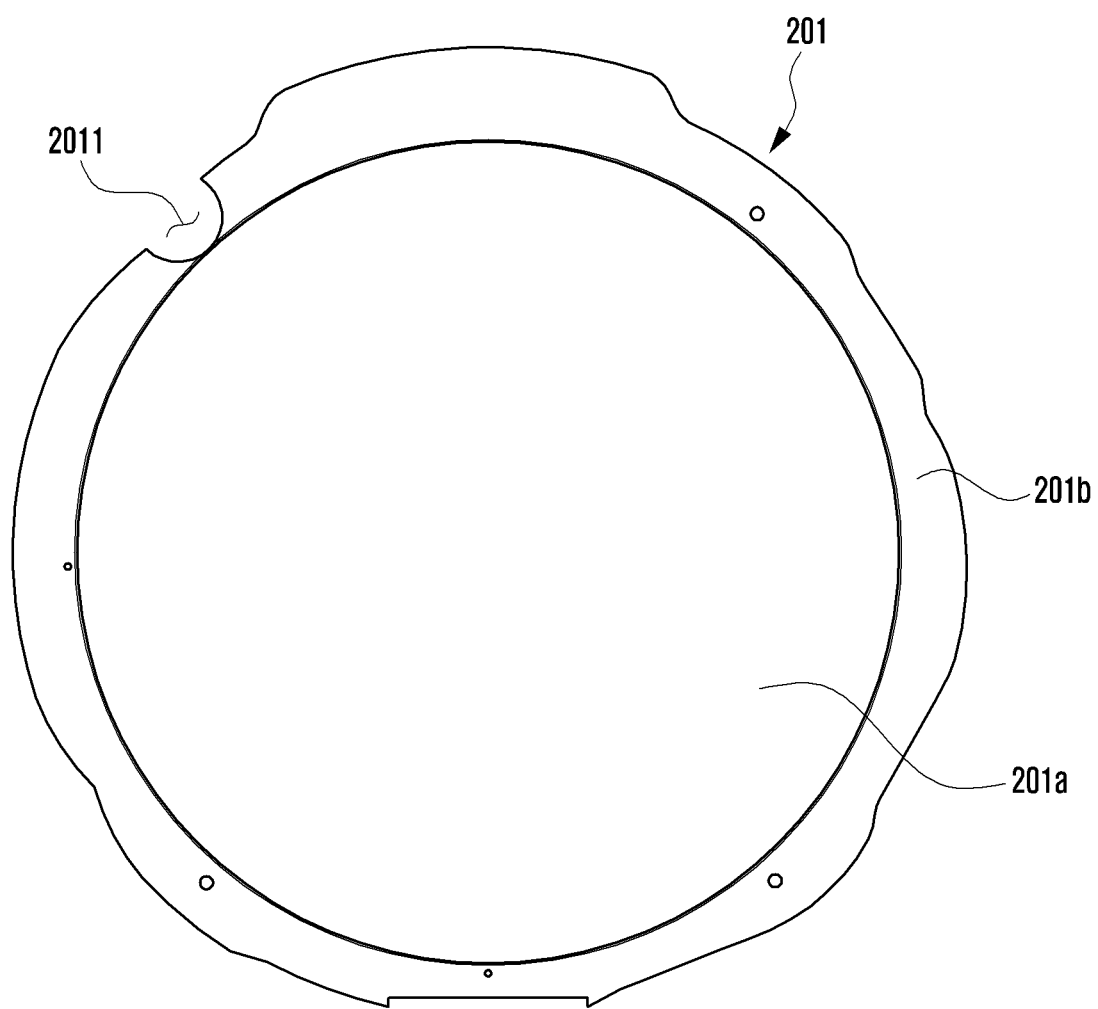
FIG. 6A is a plan view of a front plate according to certain embodiments of the disclosure.

FIG. 6A is a plan view of the front plate 201 according to certain embodiments of the disclosure.

With reference to FIG. 6A, the front plate 201 may be made of a transparent glass material or acrylic material. In one embodiment, the front plate 201 may include a display region 201a facing the display 220 and a flange 201b surrounding the rim of the display region 201a. In one embodiment, the flange 201b may include a region facing the black matrix (BM) area of the display (e.g., display 220 in FIG. 4). In one embodiment, the through groove 2011 that the extension part (e.g., extension part 312 in FIG. 5) of the light emitting structure (e.g., light emitting structure 310 in FIG. 5) penetrates is formed by at least a portion of the flange 201b, helping the use of an unessential region of the front plate 201 and the efficient arrangement of the display (e.g., display 220 in FIG. 4).

Figure 6B:
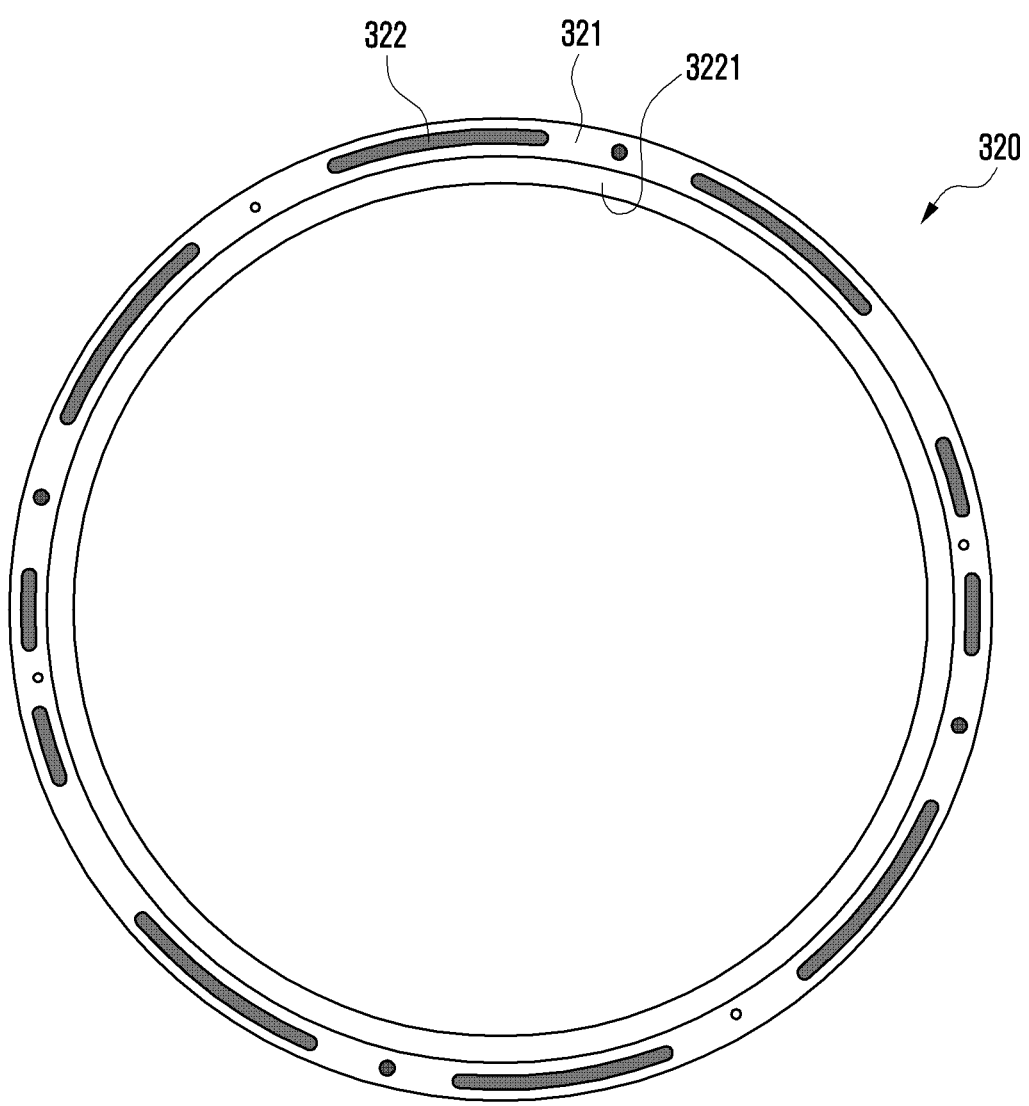
FIG. 6B is a view showing the configuration of a waterproof member according to certain embodiments of the disclosure.

FIG. 6B is a view showing the configuration of the waterproof member 320 according to certain embodiments of the disclosure.

With reference to FIG. 6B, the waterproof member 320 may be formed in the shape of a closed-loop band. In one embodiment, although the waterproof member 320 is shown in a circular shape, it may be formed in an elliptical, rectangular, or polygonal shape according to the shape of the display (e.g., display 220 in FIG. 4) and/or the side bezel structure (e.g., side bezel structure 206 in FIG. 4).

In certain embodiments, the waterproof member 320 may include a rigid body 322 and an elastic body 321 disposed to surround the rigid body 322. In one embodiment, the waterproof member 320 may be formed so that the elastic body 321 substantially surrounds most of the rigid body 322 to improve the sealing force, but may also be formed so that the rigid body 322 is exposed in at least some regions. Even in this case, the elastic body 321 may have a seamless extension structure in a closed loop shape. In one embodiment, the seating groove 3221 may be disposed to be close to the inner diameter direction of the waterproof member 320 for smooth seating of the light guide member (e.g., light guide member 311 in FIG. 5).

Figure 7:
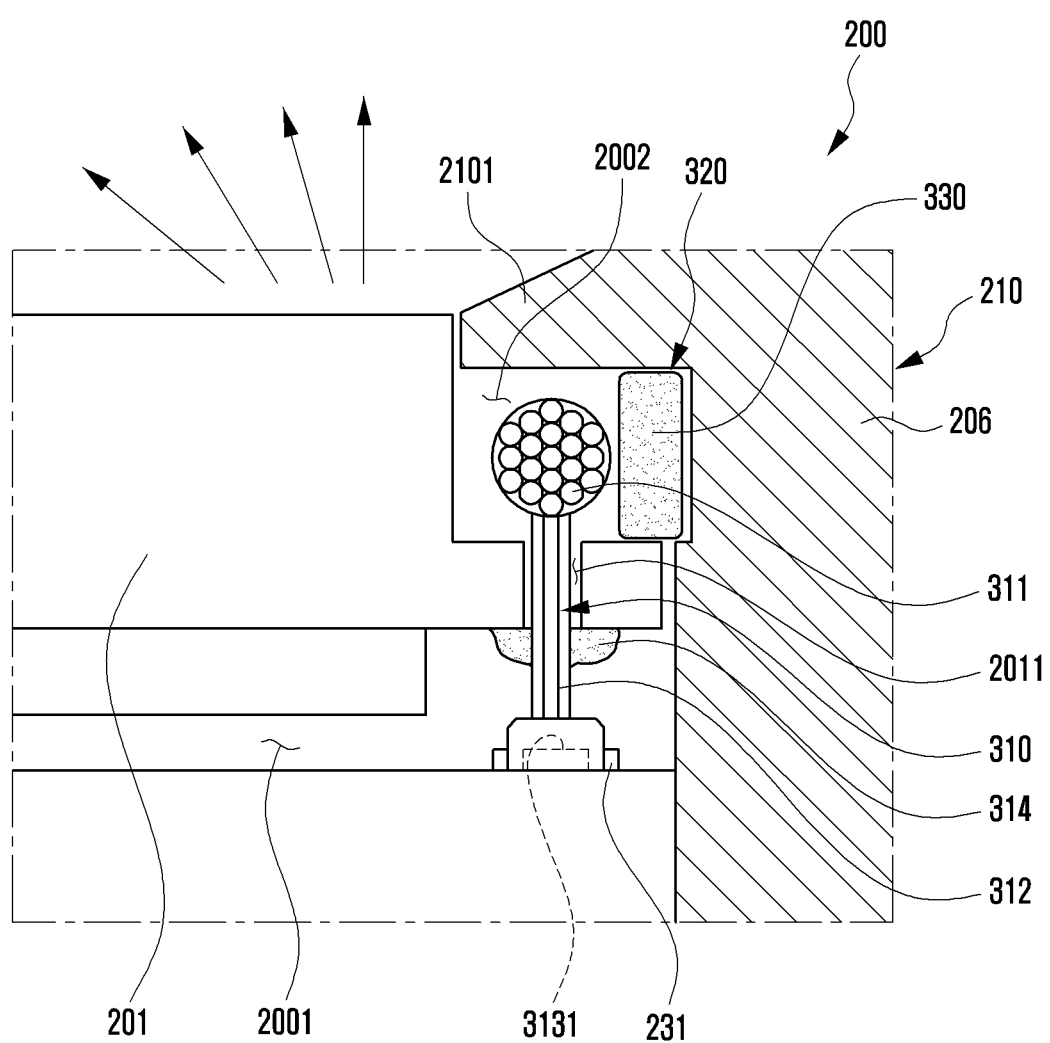
FIG. 7 is a sectional view of essential parts of the electronic device showing an arrangement structure of a light emitting structure according to certain embodiments of the disclosure.

FIG. 7 is a sectional view of essential parts of the electronic device 200 showing an arrangement structure of the light emitting structure 310 according to certain embodiments of the disclosure.

In the following description of FIG. 7, components that are substantially the same as those in FIG. 5 are given the same reference numerals, and detailed descriptions thereof may be omitted.

With reference to FIG. 7, the waterproof member 330 and the light guide member 311 may be spaced apart from each other in the space 2002 between the front plate 201 and the side bezel structure 206. In this case, the waterproof member 330 may be made of an elastic body such as rubber, urethane, or silicone. In another embodiment, as described above, the waterproof member 330 may be formed by injecting a rigid body (e.g., rigid body 322 in FIG. 5) and an elastic body (e.g., elastic body 321 in FIG. 5). In one embodiment, the light guide member 311 may be disposed close to the front plate 201. In this case, the light transmitted from the light guide member 311 can be seen from the outside through at least a portion of the rim of the front plate 201. This is because the front plate 201 is made of a transparent light-guidable material (e.g., transparent glass or acrylic), which makes the display (e.g., display 220 in FIG. 4) disposed thereunder be seen. In another embodiment, the light transmitted from the light guide member 311 may be released to the outside through a light scattering member provided separately. In one embodiment, the light scattering member may include the inner bezel 2101 provided as part of the side bezel structure 206 as described above, or a decorative member made of a light scattering material and disposed around it.

Figure 8:
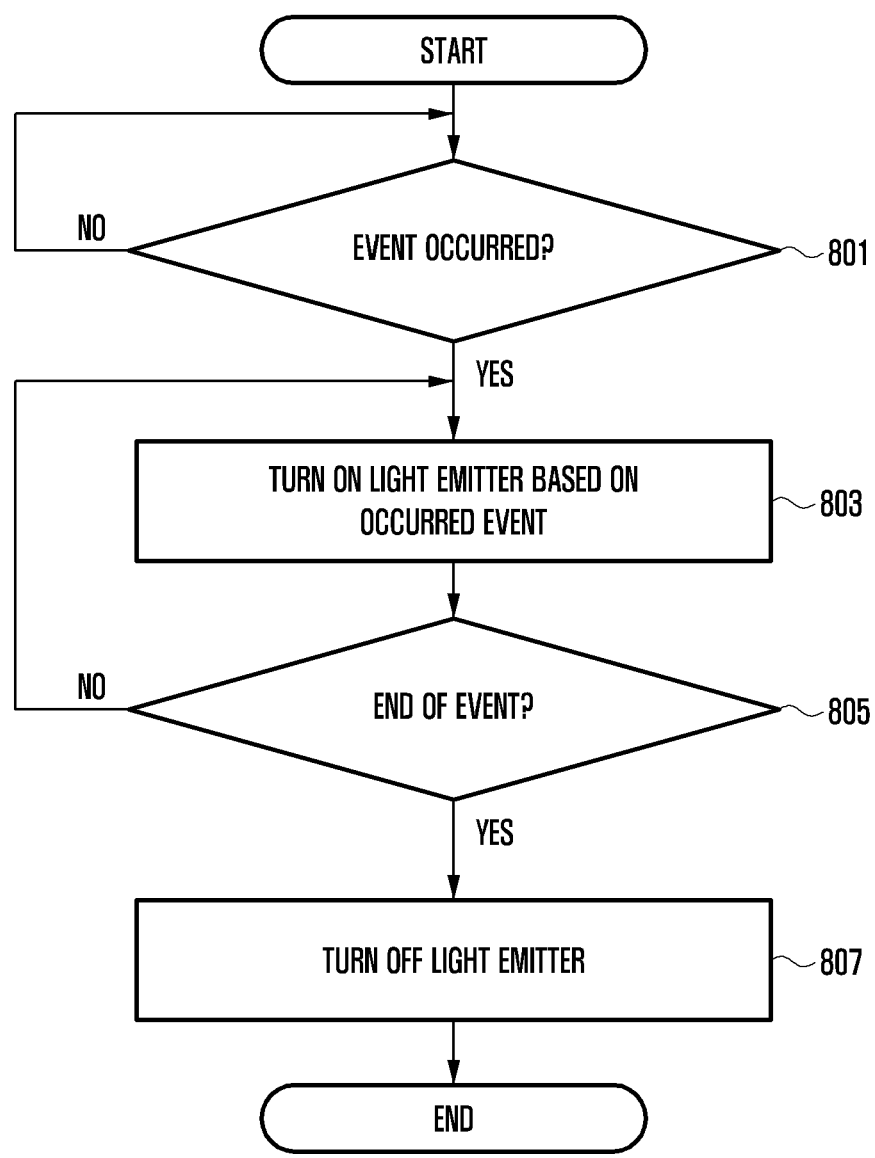
FIG. 8 is a flowchart of a procedure for controlling a light emitter according to certain embodiments of the disclosure.
Figure 9A:
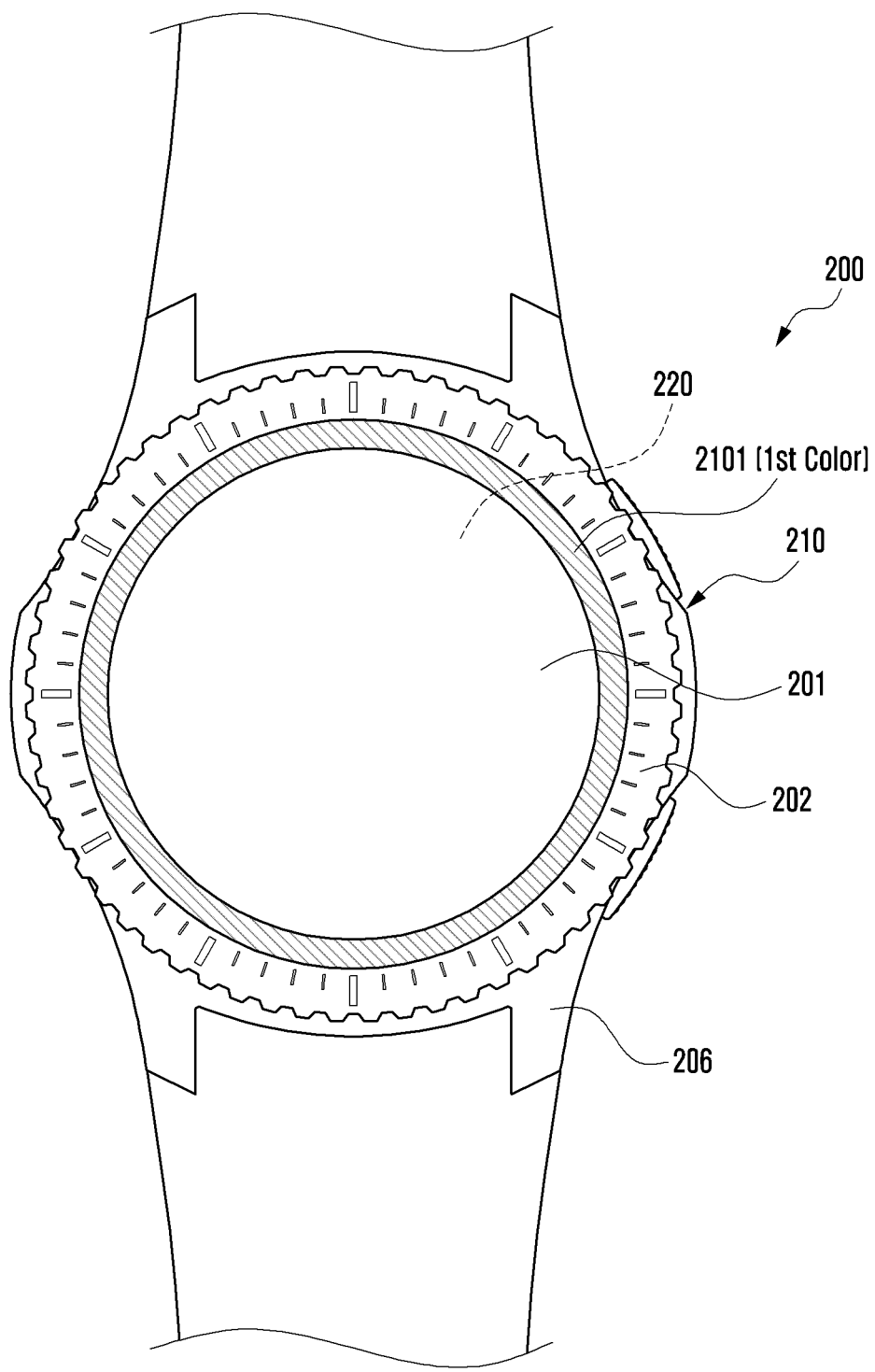
FIGS. 9A and 9B are schematic diagrams illustrating visual indications based on the control of the light emitter according to certain embodiments of the disclosure.
Figure 9B:
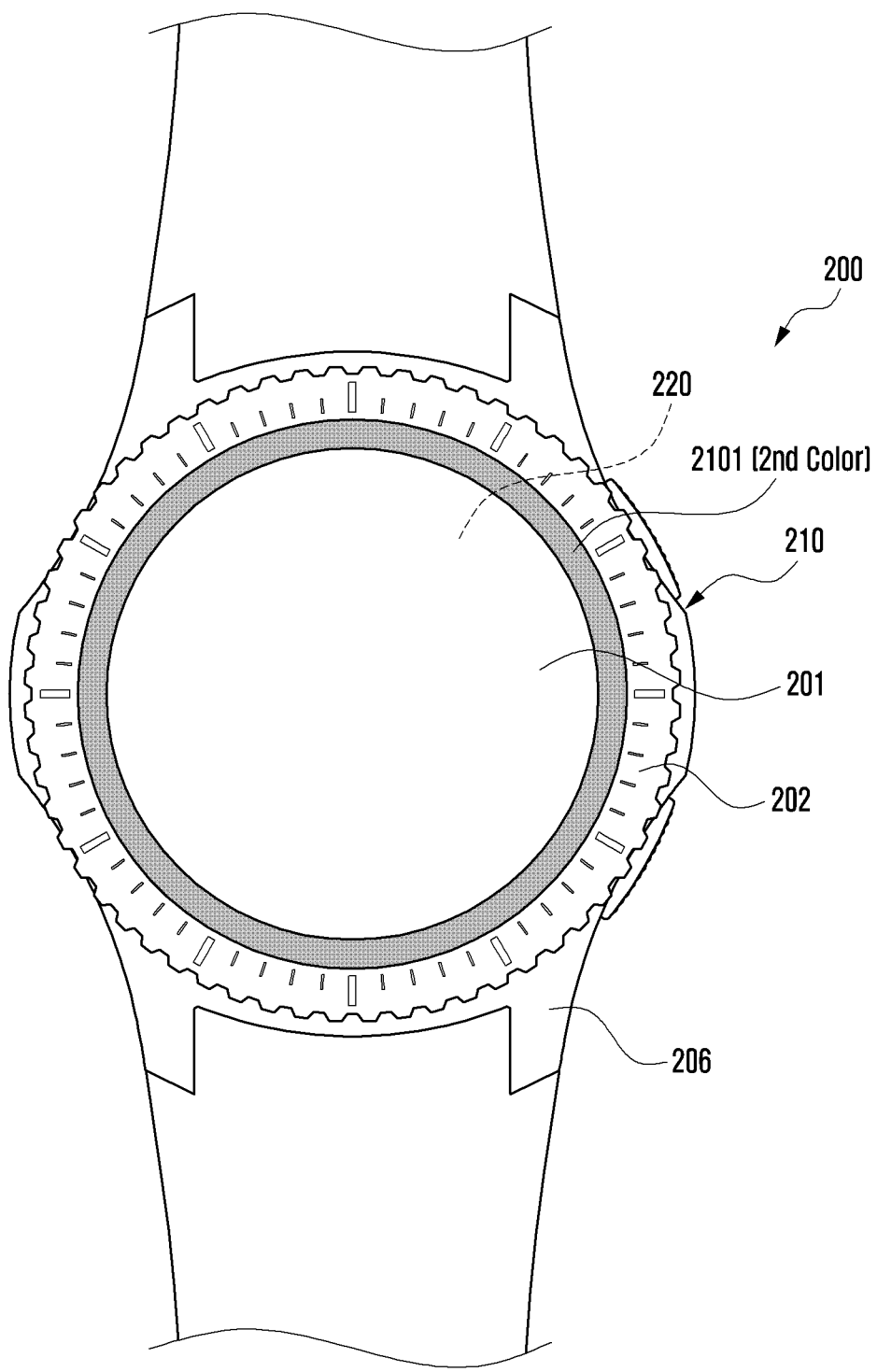

FIG. 8 is a flowchart of a procedure for controlling the light emitter 3131 according to certain embodiments of the disclosure. FIGS. 9A and 9B are schematic diagrams illustrating visual indications based on the control of the light emitter 3131 according to certain embodiments of the disclosure.

With reference to FIGS. 8 to 9B, at operation 801, the electronic device 200 (e.g., processor 120 in FIG. 1) may determine whether an event has occurred in the electronic device 200. In one embodiment, the electronic device 200 may detect various conditions in which the light emitter 3131 of the light emitting structure 310 can be turned on. For example, whether to turn on the light emitter 3131 in response to an occurrence of an event may be determined based on biometric information collected by a sensor (e.g., sensor 211 in FIG. 2B) of the electronic device 200, data information received from the outside, or status information of the electronic device 200. In one embodiment, the biometric information may include biometric information of the user provided from a biometric sensor of the electronic device 200. In one embodiment, the status information of the electronic device 200 may include information about the temperature inside the electronic device, information about the humidity outside, or information about the remaining battery level. In another embodiment, whether to turn on the light emitter 3131 may be determined based on various changes in known functions of the electronic device.

In certain embodiments, upon determining that an event has occurred, at operation 803, the electronic device 200 (e.g., processor 120 in FIG. 1) may turn on the light emitter 3131. In this case, the display (e.g., display 220 in FIG. 4) may be not activated. In another embodiment, the electronic device 200 (e.g., processor 120 in FIG. 1) may activate the display (e.g., display 220 in FIG. 4) to control visual display in combination with the light emitter 3131. In one embodiment, the electronic device 200 may control the lighting state of the light emitter 3131 according to the corresponding condition of the generated event. In one embodiment, the electronic device 200 may control at least one of the brightness, color, or lighting state of the light emitter 3131 according to the corresponding condition of the generated event. For example, if the health state of the user based on information provided by the biometric sensor is a first health state, the electronic device 200 may control the light emitter 3131 to emit light of a first color. In this case, the light of the first color from the light emitter 3131 may be released to the outside for being visible as shown in FIG. 9A through the inner bezel 2101 disposed as part of the side bezel structure 206 along the border of the front plate 201 (e.g., window) of the electronic device 200. In one embodiment, if the user's health state based on the information provided by the biometric sensor is a second health state different from the first health state, the electronic device 200 may control the light emitter 3131 to emit light of a second color different from the first color. In this case, the light of the second color may be released to the outside for being visible as shown in FIG. 9B through the inner bezel 2101 disposed as part of the side bezel structure 206 along the border of the front plate 201 of the electronic device 200. For example, the electronic device 200 may control the color (e.g., identical or different color) of light emitted by the light emitter 3131 to be darker or lighter according to the user's health condition information provided by the biometric sensor. In another embodiment, when data is received from the outside during usage, the electronic device 200 may control the light emitter 3131 to be turned on and off and/or to be turned on at regular or irregular intervals.

In certain embodiments, at operation 805, the electronic device 200 may check whether the event has ended. If the corresponding event has ended, at operation 807, the electronic device 200 may control the light emitter 3131 to be turned off. In another embodiment, while controlling the light emitter 3131 to be continuously turned on in a specific color for a preset period of time set by the user, when an event occurs, the electronic device 200 may provide visual notification information to the user through a change in color, a periodic blinking operation, or a change in brightness. In another embodiment, the electronic device may provide auditory information through an acoustic module disposed inside the electronic device and/or tactile information through a vibration module together with visual information through the light emitter.

Figure 10A:
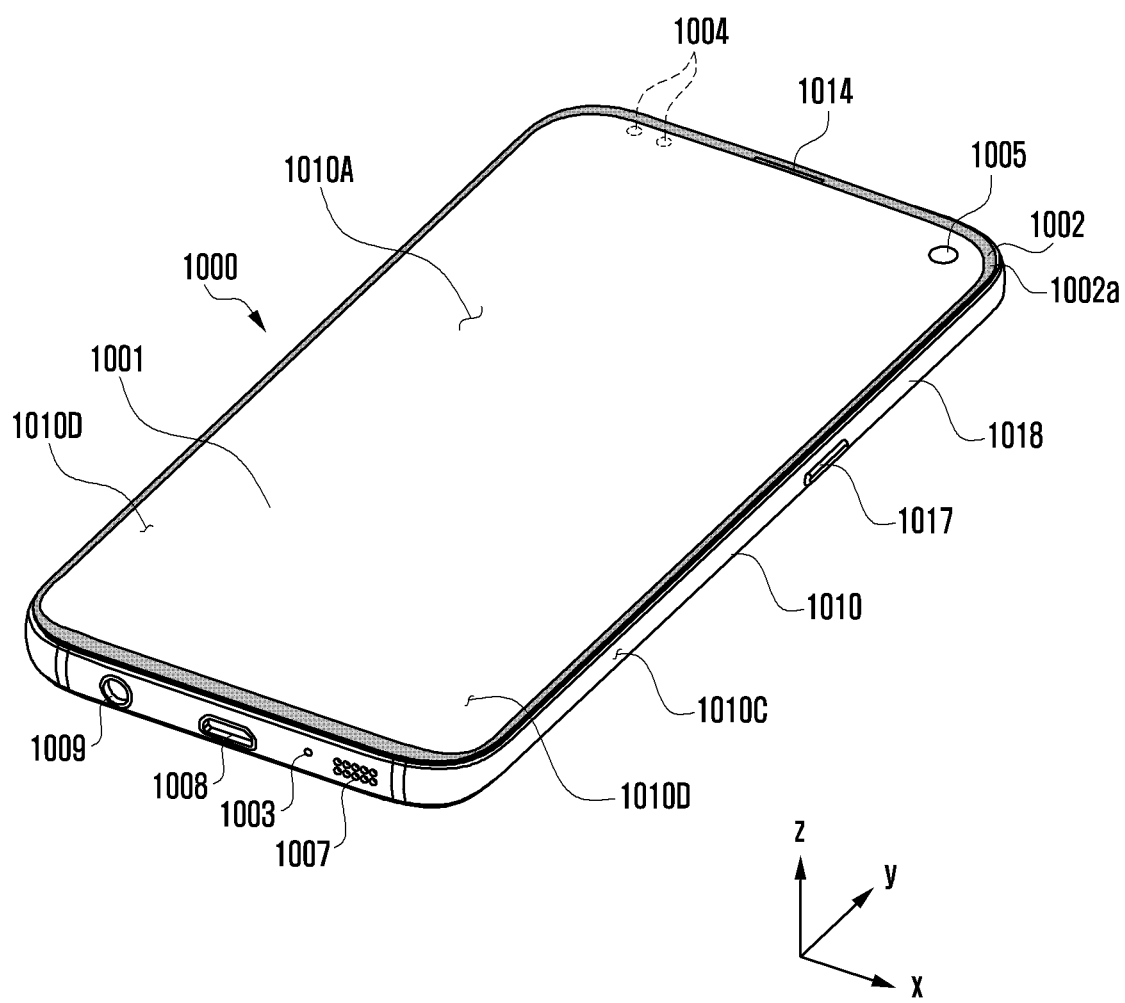
FIGS. 10A and 10B are front and rear perspective views of an electronic device including a light emitting structure according to certain embodiments of the disclosure.
Figure 10B:
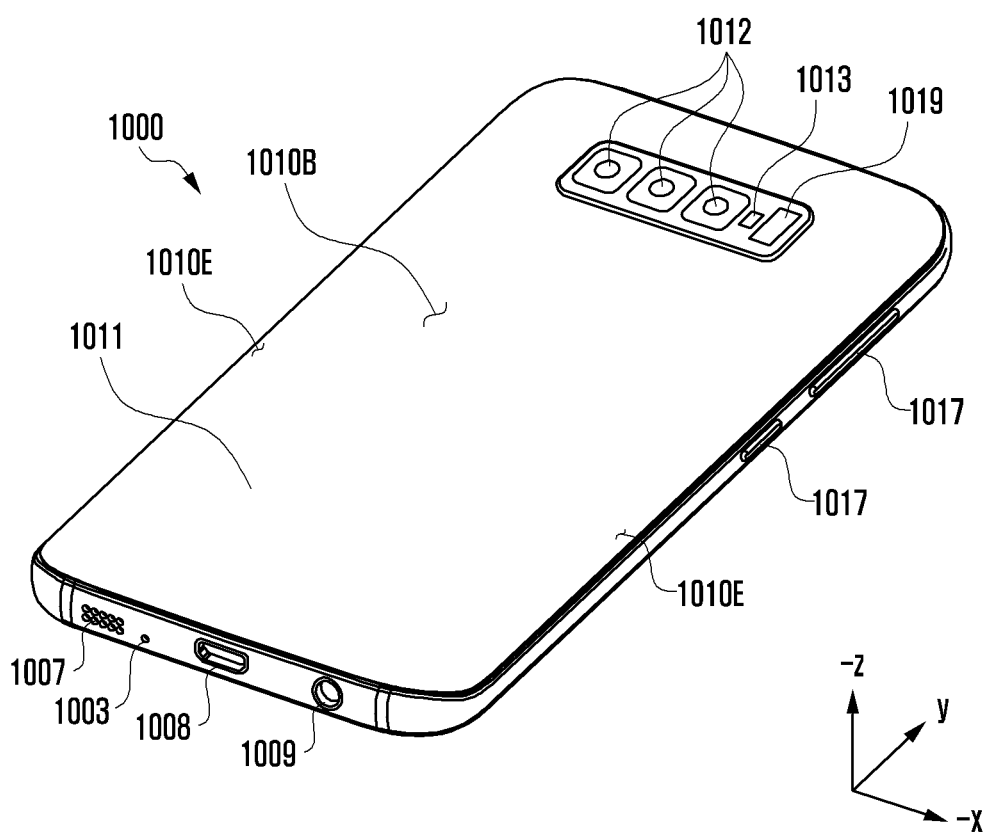

FIGS. 10A and 10B are front and rear perspective views of an electronic device 1000 including a light emitting structure 1002a according to certain embodiments of the disclosure.

FIG. 10A illustrates a perspective view showing a front surface of a mobile electronic device 1000 according to an embodiment, and FIG. 10B illustrates a perspective view showing a rear surface of the mobile electronic device 1000 shown in FIG. 10A.

Referring to FIGS. 10A and 10B, the mobile electronic device 1000 may include a housing 1010 that includes a first surface (or front surface) 1010A, a second surface (or rear surface) 1010B, and a lateral surface 1010C that surrounds a space between the first surface 1010A and the second surface 1010B. The housing 1010 may refer to a structure that forms a part of the first surface 1010A, the second surface 1010B, and the lateral surface 1010C. The first surface 1010A may be formed of a front plate 1002 (e.g., a glass plate or polymer plate coated with a variety of coating layers) at least a part of which is substantially transparent. The second surface 1010B may be formed of a rear plate 1011 which is substantially opaque. The rear plate 1011 may be formed of, for example, coated or colored glass, ceramic, polymer, metal (e.g., aluminum, stainless steel (STS), or magnesium), or any combination thereof. The lateral surface 1010C may be formed of a lateral bezel structure (or "lateral member") 1018 which is combined with the front plate 1002 and the rear plate 1011 and includes a metal and/or polymer. The rear plate 1011 and the lateral bezel structure 1018 may be integrally formed and may be of the same material (e.g., a metallic material such as aluminum).

The front plate 1002 may include two first regions 1010D disposed at long edges thereof, respectively, and bent and extended seamlessly from the first surface 1010A toward the rear plate 1011. Similarly, the rear plate 1011 may include two second regions 1010E disposed at long edges thereof, respectively, and bent and extended seamlessly from the second surface 1010B toward the front plate 1002. The front plate 1002 (or the rear plate 1011) may include only one of the first regions 1010D (or of the second regions 1010E). The first regions 1010D or the second regions 1010E may be omitted in part. When viewed from a lateral side of the mobile electronic device 1000, the lateral bezel structure 1018 may have a first thickness (or width) on a lateral side where the first region 1010D or the second region 1010E is not included, and may have a second thickness, being less than the first thickness, on another lateral side where the first region 1010D or the second region 1010E is included.

The mobile electronic device 1000 may include at least one of a display 1001, audio modules 1003, 1007 and 1014, sensor modules 1004 and 1019, camera modules 1005, 1012 and 1013, a key input device 1017, a light emitting device, and connector holes 1008 and 1009. The mobile electronic device 1000 may omit at least one (e.g., the key input device 1017 or the light emitting device) of the above components, or may further include other components.

The display 1001 may be exposed through a substantial portion of the front plate 1002, for example. At least a part of the display 1001 may be exposed through the front plate 1002 that forms the first surface 1010A and the first region 1010D of the lateral surface 1010C. Outlines (i.e., edges and corners) of the display 1001 may have substantially the same form as those of the front plate 1002. The spacing between the outline of the display 1001 and the outline of the front plate 1002 may be substantially unchanged in order to enlarge the exposed area of the display 1001.

A recess or opening may be formed in a portion of a display area of the display 1001 to accommodate at least one of the audio module 1014, the sensor module 1004, the camera module 1005, and the light emitting device. At least one of the audio module 1014, the sensor module 1004, the camera module 1005, the fingerprint sensor (not shown), and the light emitting element may be disposed on the back of the display area of the display 1001. The display 1001 may be combined with, or adjacent to, a touch sensing circuit, a pressure sensor capable of measuring the touch strength (pressure), and/or a digitizer for detecting a stylus pen. At least a part of the sensor modules 1004 and 1019 and/or at least a part of the key input device 1017 may be disposed in the first region 1010D and/or the second region 1010E.

The audio modules 1003, 1007 and 1014 may correspond to a microphone hole 1003 and speaker holes 1007 and 1014, respectively. The microphone hole 1003 may contain a microphone disposed therein for acquiring external sounds and, in a case, contain a plurality of microphones to sense a sound direction. The speaker holes 1007 and 1014 may be classified into an external speaker hole 1007 and a call receiver hole 1014. The microphone hole 1003 and the speaker holes 1007 and 1014 may be implemented as a single hole, or a speaker (e.g., a piezo speaker) may be provided without the speaker holes 1007 and 1014.

The sensor modules 1004 and 1019 may generate electrical signals or data corresponding to an internal operating state of the mobile electronic device 1000 or to an external environmental condition. The sensor modules 1004 and 1019 may include a first sensor module 1004 (e.g., a proximity sensor) and/or a second sensor module (e.g., a fingerprint sensor) disposed on the first surface 1010A of the housing 1010, and/or a third sensor module 1019 (e.g., a heart rate monitor (HRM) sensor) and/or a fourth sensor module (e.g., a fingerprint sensor) disposed on the second surface 1010B of the housing 1010. The fingerprint sensor may be disposed on the second surface 1010B as well as the first surface 1010A (e.g., the display 1001) of the housing 1010. The electronic device 1000 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 1005, 1012 and 1013 may include a first camera device 1005 disposed on the first surface 1010A of the electronic device 1000, and a second camera device 1012 and/or a flash 1013 disposed on the second surface 1010B. The camera module 1005 or the camera module 1012 may include one or more lenses, an image sensor, and/or an image signal processor. The flash 1013 may include, for example, a light emitting diode or a xenon lamp. Two or more lenses (infrared cameras, wide angle and telephoto lenses) and image sensors may be disposed on one side of the electronic device 1000.

The key input device 1017 may be disposed on the lateral surface 1010C of the housing 1010. The mobile electronic device 1000 may not include some or all of the key input device 1017 described above, and the key input device 1017 which is not included may be implemented in another form such as a soft key on the display 1001. The key input device 1017 may include the sensor module disposed on the second surface 1010B of the housing 1010.

The light emitting device may be disposed on the first surface 1010A of the housing 1010. For example, the light emitting device may provide status information of the electronic device 1000 in an optical form. The light emitting device may provide a light source associated with the operation of the camera module 1005. The light emitting device may include, for example, a light emitting diode (LED), an IR LED, or a xenon lamp.

The connector holes 1008 and 1009 may include a first connector hole 1008 adapted for a connector (e.g., a USB connector) for transmitting and receiving power and/or data to and from an external electronic device, and/or a second connector hole 1009 adapted for a connector (e.g., an earphone jack) for transmitting and receiving an audio signal to and from an external electronic device.

Some sensor modules 1005 of camera modules 1005 and 1012, some sensor modules 1004 of sensor modules 1004 and 1019, or an indicator may be arranged to be exposed through a display 1001. For example, the camera module 1005, the sensor module 1004, or the indicator may be arranged in the internal space of an electronic device 1000 so as to be brought into contact with an external environment through an opening of the display 1001, which is perforated up to a front plate 1002. In another embodiment, some sensor modules 1004 may be arranged to perform their functions without being visually exposed through the front plate 1002 in the internal space of the electronic device. For example, in this case, an area of the display 1001 facing the sensor module may not require a perforated opening.

In certain embodiments, the electronic device 1000 may include a light emitting structure 1002a disposed along the rim of the front plate 1002 to be visually seen from the outside. In one embodiment, the light emitting structure 1002a may have substantially the same arrangement structure as that of the light emitting structure 310 in FIG. 5 described above. In one embodiment, the light emitting structure 1002a may be disposed together with a waterproof member (not shown) disposed in the internal space of the electronic device 1000 in correspondence with the rim of the front plate 1002, and may be disposed to be visible from the outside through a specific region of the front plate 1002 corresponding to the BM area disposed along the rim of the display 1001. In another embodiment, the light emitting structure may be disposed along the side bezel structure 1018 of the electronic device 1000 or may be disposed along the rim of the rear plate 1011.

The electronic device according to the disclosure may provide visual notification information through a separate light emitting structure to thereby reduce unnecessary power consumption by omitting driving of the display. In addition, as the light emitting structure is disposed together with a waterproof member, the mounting space can be efficiently secured, helping slimming of the electronic device.

According to certain embodiments, an electronic device (e.g., electronic device 200 in FIG. 4) may include: a housing (e.g., housing 210 in FIG. 4); a cover (e.g., front plate 201 in FIG. 4) disposed on at least a portion of the housing; at least one fastening member (e.g., fastening members 250 and 260 in FIG. 2A) connected to the housing and configured to be detachable fastened around a human body; at least one light emitting structure (e.g., light emitting structure 310 in FIG. 4) disposed in an internal space (e.g., internal space 2001 in FIG. 4) of the housing; and a waterproof member (e.g., waterproof member 320 in FIG. 4) that is between the housing and the cover (e.g., space 2001 in FIG. 4), having a closed loop shape sealing the internal space, wherein the waterproof member comprises a light scattering material, wherein the light emitting structure is configured to emit light that is at least partially visible from outside through the waterproof member.

In certain embodiments, the light emitting structure may include a light guide member (e.g., light guide member 311 in FIG. 4) disposed between the waterproof member and the cover, an extension part (e.g., extension part 312 in FIG. 4) extending from the light guide member to a printed circuit board (e.g., printed circuit board 230 in FIG. 4) disposed in the internal space, and a connector (e.g., connector 313 in FIG. 4) electrically connecting the extension part to the printed circuit board and includes at least one light emitter (e.g., light emitter 3131 in FIG. 4).

In certain embodiments, the light guide member may include at least one optical fiber.

In certain embodiments, the light emitter may include at least one light emitting diode (LED).

In certain embodiments, the waterproof member has a seating groove formed in a portion of the waterproof member, and the light guide member may be at least partially seated in the seating groove (e.g., seating groove 3221 in FIG. 4).

In certain embodiments, the waterproof member may include a rigid body (e.g., rigid body 322 in FIG. 4) and an elastic body (e.g., elastic body 321 in FIG. 4) formed to surround at least some of the rigid body, and the seating groove may be formed through the rigid body.

In certain embodiments, the elastic body extends seamlessly along the closed loop shape of the waterproof member.

In certain embodiments, the cover may be coupled to the housing in the outer direction in the internal space, and the extension part may be extended to the printed circuit board via a through groove (e.g., through groove 2011 in FIG. 4) formed in at least some of the rim of the cover.

In certain embodiments, the extension part may be fixed to the through groove by using an adhesive member (e.g., adhesive member 314 in FIG. 4).

In certain embodiments, the electronic device may further include a display (e.g., display 220 in FIG. 4) disposed to be visible from the outside through at least some of the cover in the internal space.

In certain embodiments, the electronic device may include a light scattering member that is arranged to surround the edge of the display and disposed in the housing to transmit light provided from the waterproof member to the outside.

In certain embodiments, the light scattering member may include a decorative member extending from the housing or coupled to the housing.

In certain embodiments, the light scattering member may surround the edge of the display and be disposed at a position overlapping the cover when the display is viewed from above.

In certain embodiments, the electronic device may further include at least one processor (e.g., processor 120 in FIG. 1) disposed in the housing that detects an event of the electronic device and controls the light emitting structure according to the detected event.

In certain embodiments, the at least one processor may control at least one of the color, brightness, or blinking state of the light emitting structure according to the detected event.

According to certain embodiments, an electronic device may include: a housing; a cover disposed on at least a portion of the housing; at least one light emitting structure disposed in an internal space of the housing; and a waterproof member that is between the housing and the cover, having a closed loop shape sealing the internal space, wherein the waterproof member comprises light scattering material, wherein the light emitting structure is configured to emit light that is at least partially visible from the outside through the waterproof member.

In certain embodiments, the light emitting structure may include a light guide member disposed between the waterproof member and the cover, an extension part extending from the light guide member to a printed circuit board disposed in the internal space, and a connector electrically connecting the extension part to the printed circuit board, wherein the connector includes at least one light emitter.

In certain embodiments, the light guide member may include at least one optical fiber.

In certain embodiments, the waterproof member has a seating groove in a portion of the waterproof member, and the light guide member may be at least partially seated in the seating groove.

In certain embodiments, the electronic device may further include at least one processor disposed in the housing, wherein the at least one processor is configured to detect an event of the electronic device and controls the light emitting structure according to the detected event.

Hereinabove, certain embodiments of the disclosure have been shown and described for the purpose of illustration without limiting the subject matter of the disclosure. It should be understood that many variations and modifications of the basic inventive concept described herein will still fall within the spirit and scope of the disclosure as defined in the appended claims and their equivalents.

What is claimed is:
1. An electronic device comprising:
a housing;
a cover disposed on at least a portion of the housing;
at least one fastening member connected to the housing and configured to be detachably fastened around a human body;
at least one light emitting structure disposed in an internal space of the housing; and a waterproof member that is between the housing and the cover, having a closed loop shape sealing the internal space, wherein the waterproof member comprises light scattering material, wherein the at least one light emitting structure is configured to emit light that is at least partially visible from outside through the waterproof member, and further comprises: a light guide member disposed between the waterproof member and the cover; an extension part extending from the light guide member to a printed circuit board disposed in the internal space; and a connector electrically connecting the extension part to the printed circuit board, wherein the connector includes at least one light emitter; and wherein the waterproof member has a seating groove formed in a portion of the waterproof member, and the light guide member is at least partially seated in the seating groove.

2. The electronic device of claim 1, wherein the light guide member includes at least one optical fiber.

3. The electronic device of claim 1, wherein the light emitter includes at least one light emitting diode (LED).

4. The electronic device of claim 1, wherein the waterproof member includes a rigid body and an elastic body arranged to surround at least some of the rigid body, and wherein the seating groove is formed through the rigid body.

5. The electronic device of claim 4, wherein the elastic body extends seamlessly along the closed loop shape of the waterproof member.

6. The electronic device of claim 1, wherein:
the cover is coupled to the housing in an outer direction in the internal space; and
the extension part is extended to the printed circuit board via a through groove formed in at least some of a rim of the cover.

7. The electronic device of claim 6, further comprising an adhesive member fixing the extension part to the through groove.

8. The electronic device of claim 1, further comprising a display disposed to be visible from the outside through at least some of the cover in the internal space.

9. The electronic device of claim 8, further comprising a light scattering member that is arranged to surround an edge of the display and disposed in the housing to transmit light provided from the waterproof member to the outside.

10. The electronic device of claim 9, wherein the light scattering member includes a decorative member extending from the housing or coupled to the housing.

11. The electronic device of claim 9, wherein the light scattering member surrounds the edge of the display and is disposed at a position overlapping the cover when the display is viewed from above.

12. The electronic device of claim 1, further comprising at least one processor disposed in the housing, the at least one processor configured to detect an event of the electronic device and control the at least one light emitting structure according to the detected event.

13. The electronic device of claim 12, wherein the at least one processor is configured to control at least one of a color, brightness, or a blinking state of the at least one light emitting structure according to the detected event.

14. An electronic device comprising:
a housing;
a cover disposed on at least a portion of the housing;
at least one light emitting structure disposed in an internal space of the housing; and
a waterproof member that is between the housing and the cover, having a closed loop shape sealing the internal space, wherein the waterproof member comprises light scattering material,
wherein the at least one light emitting structure is configured to emit light that is at least partially visible from outside through the waterproof member, and further comprises: a light guide member disposed between the waterproof member and the cover; an extension part extending from the light guide member to a printed circuit board disposed in the internal space; and a connector electrically connecting the extension part to the printed circuit board, wherein the connector includes at least one light emitter; and wherein the waterproof member has a seating groove in a portion of the waterproof member, and the light guide member is at least partially seated in the seating groove.

15. The electronic device of claim 14, wherein the light guide member includes at least one optical fiber.

16. The electronic device of claim 14, further comprising at least one processor disposed in the housing, wherein the at least one processor is configured to detect an event of the electronic device and control the at least one light emitting structure according to the detected event.

* * * * *

UNITED STATES PATENT AND TRADEMARK OFFICE
CERTIFICATE OF CORRECTION

| | | |
|---|---|---|
| PATENT NO. | : 11,405,998 B2 | Page 1 of 1 |
| APPLICATION NO. | : 17/015333 | |
| DATED | : August 2, 2022 | |
| INVENTOR(S) | : Juhyup Lee et al. | |

It is certified that error appears in the above-identified patent and that said Letters Patent is hereby corrected as shown below:

In the Claims

Column 21, Claim 3, Line 21 should read as follows:
--...wherein the at least one light emitting structure includes...--

Signed and Sealed this
Sixth Day of September, 2022

Katherine Kelly Vidal
*Director of the United States Patent and Trademark Office*